Oct. 30, 1934.　　　　H. E. TWOMLEY　　　　1,978,613
BOX MAKING MACHINE
Filed July 31, 1933　　　5 Sheets-Sheet 1

Inventor
Herbert E. Twomley
By Lyon & Lyon
Attorneys

Oct. 30, 1934.  H. E. TWOMLEY  1,978,613
BOX MAKING MACHINE
Filed July 31, 1933   5 Sheets-Sheet 2

Inventor
Herbert E. Twomley
By Lyon & Lyon
Attorneys

Oct. 30, 1934.  H. E. TWOMLEY  1,978,613
BOX MAKING MACHINE
Filed July 31, 1933  5 Sheets-Sheet 3

Inventor
Herbert E. Twomley
By Lyon & Lyon
Attorneys

Oct. 30, 1934.                H. E. TWOMLEY                1,978,613
                              BOX MAKING MACHINE
                   Filed July 31, 1933        5 Sheets-Sheet 5

Inventor
Herbert E. Twomley
By Lyon & Lyon
Attorneys

Patented Oct. 30, 1934

1,978,613

UNITED STATES PATENT OFFICE 1,978,613

BOX MAKING MACHINE

Herbert E. Twomley, Riverside, Calif., assignor to Donald Parker and Citizens National Trust and Savings Bank of Riverside, administrators of George D. Parker, deceased Application July 31, 1933, Serial No. 682,913

10 Claims. (Cl. 1—10)

My invention relates to box making machines and has particular reference to a machine for manufacturing boxes from prepared ends and in which the sides and bottom of the box are to be formed from one or more separate lengths of material.

In the box making art various machines have been devised for the purpose of automatically supporting and rotating forms or carriers for the end pieces or shooks to be used in the manufacture of boxes so as to successively present different edges of the end shooks to the nail-driving apparatus permitting successive sides to be secured to the ends to form the box.

A typical machine of this type is shown in the Herbert E. Twomley application, Serial No. 533,655, in which the end shooks for the box are inserted between guides to rest upon an anvil which in turn is rotatable in increments of 90° to present first one side, then the bottom, and then the opposite side edges of the end shook uppermost to receive the side boards and bottom boards of the box and to have them nailed thereon by the nailing apparatus. However, in this machine the end shooks are not clamped or otherwise secured in their forms, so that it is necessary to provide a support upon that edge of the end shook opposite to the edge on which the nailing occurs, the strain of the nailing being taken up by the full width of the end shook, transmitting the force to the anvil or other support against which the end shook rests.

Such machines are satisfactory for the production of boxes in which the end shooks are formed of a solid board, but in certain types of boxes or crates it is the practice to construct the ends of the box from a plurality of spaced slats connected to battens or cross-pieces which do not lie in the plane of the boards or slats forming the major part of the end shook. In the manufacture of such boxes it is, therefore, necessary not only to support the opposite ends of the box but also to provide some additional support which extends below the battens or cross-pieces to support these members, while nails are being driven into them.

Also in all of the prior machines it has been the practice to always start the forms from a predetermined point, such as that one edge of the end shook uppermost to receive one set of side boards for the box, then to rotate the forms through 90° to present the bottom edge of the end shook uppermost, then to rotate the form through another 90° angle to present the opposite side edge of the end shook for receiving the second side of the box, and then to rotate the form through 180° to remove the finished box, leaving the forms in their original position. In other words, during the manufacture of each box the forms are rotated to a total of 360°.

It is, therefore, an object of my invention to provide a box making machine in which the forms or holders for the end shooks are adapted to receive and adequately support end shooks which are built up of slats and battens.

Another object of the invention is to provide a machine of the character described in which the forms are provided with anvils which anchor below the cross pieces or battens to directly support each of these battens at such time as pressure is applied thereon during the nailing operations.

Another object of the invention is to provide a machine of the character described in which the forms are made of relatively movable parts, two parts for each end of the box, in which each of the parts moves relative to the machine to insure adequate space for the entry of the end shooks, and I provide for a true clamping action on both sides of the prepared end of the shooks.

Another object of the invention is to provide a machine of the character described in which the end clamping forms are moved relative to each other and are positively locked in shook-clamping position thereby supporting the end shooks by a clamping action in addition to the presentation of anvils on the opposite sides of the posts and rails which form the built up crate ends.

Another object of the invention is to provide a machine of the character described, in which each of the separate sections of the form may be independently driven through its rotating movements but in which all of the movements of the separate parts are coordinated from a central driving mechanism.

Another object of the invention is to provide a machine of the character described in which the nails which are driven through the side and bottom slats into the posts and rails which form the built up ends of the crate, may be staggered or driven in two separate or different lines to conform to the various alignments as may be required by the peculiar arrangement of said posts and rack, the positioning of the nails being automatically timed to conform to the various arrangements of sides and bottoms.

Another object of the invention is to provide a machine of the character described in which the outer clamping members will move toward each other a predetermined amount to guarantee a constant and uniform overall length of the crate equal to the length of the slats forming the sides of the crate, and in which the inner members yield horizontally to accommodate the variations in shook thickness but do not yield vertically thus providing a solid support or anvil to resist the nailing strain.

Another object of the invention is to provide a machine of the character described in which the revolving clamping forms are provided with automatic retracting side slat stops or gages to assist the operator in quickly and accurately positioning the side slats as they are manually placed in nailing position and which gages do not interfere with the removal of the completed crate from the machine.

Another object of the invention is to provide a machine of the character described which is adjustable to receive shooks having a variety of dimensions for making different sizes of crates.

Another object of the invention is to provide a machine of the character described in which the forms may be initially placed in either of two diametrically opposite positions, namely with either of the two side edges of the end shook presented uppermost, and in which the rotary movement of the form may be first a 90° rotation to present the bottom edge of the form and then a 90° rotation to present the other side edge of the end shook for receiving the third side of the box, and then to permit the box to be removed from the form without further rotation, leaving the form in that position ready for the reception of a new end shook to form a new box or crate.

Other objects and advantages will be apparent from a study of the following specifications, read in connection with the accompanying drawings, wherein Figure 1 is a diagrammatic view of a box or crate for the construction of which my machine is particularly adapted;

Figure 1:
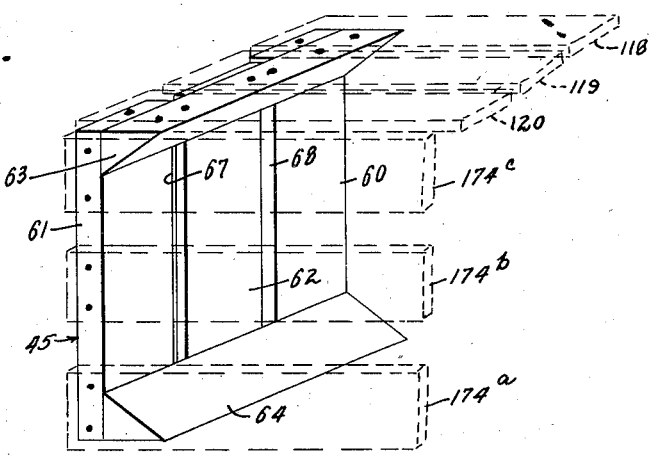

Referring to the drawings, I have illustrated a box making machine as comprising a base or bed plate 1 from which rises a pair of vertical side frames 2 and 3, these side frames being connected together near the upper ends thereof by a pair of cross bars 4 and 5. The side frames 2 and 3 of the machine constitute bearing members slidably supporting nailing apparatus including a nailing head 6 which extends entirely across the machine and carries a plurality of groups of nail driving rods 7, 8, 9 and 10 which in turn project into and operate through sets of nail chucks 11 and 12.

The nail chucks are illustrated as being mounted upon a suitable frame 13 which extends across the machine and is suspended upon the nail driving head 6 by means of a pair of rods 14 and 15 at opposite sides of the machine, respectively, so that as the nail driving head 6 is moved downwardly it brings the chucks 11 and 12 into contact with the boards to be nailed, and the chucks may stop in a position of rest upon the boards while the nail driving head 6, with its nail driving rods, may move further in a downward direction to press nails through the nail chucks into the boards.

A nailing table 16 is illustrated as being connected between the side frames 2 and 3 to constitute the supporting table upon which the box parts may be supported during the manufacture of the box. The nailing table 16 is preferably formed of a suitable casting supported at its center upon the upper end of a rod 17 which is preferably threadedly mounted in a socket 18 rotatably supported upon the upper end of a vertical bearing member 19 so that rotation of the socket 18 will elevate or lower the rod 17 and adjustably place the nailing table at higher or lower levels depending upon the variation in size of the box which is to be constructed with my machine.

The nailing table 16 is preferably locked in any of its desired positions by means of suitable bolts 20 extending through an elongated slot 21 in end plates 22 secured to the nailing table, the bolts 20 being threaded directly into the side edges of the side frames 2 and 3.

The nailing head 6 is arranged to be reciprocated in a vertical direction by connecting the outer ends of the nailing head through a pair of connecting rods 23 and 24 on opposite sides of the machine respectively to a nail driving shaft 25. The connecting rod 23 is illustrated as having its lower end 26 connected directly to a crankpin 27 formed upon a relatively large gear 28 rigidly secured to the shaft 25, while the lower end 29 of the connecting rod 24 is illustrated as being connected to a crankarm 30 also rigidly secured upon the shaft 25. Thus upon each rotation of the shaft 25 the nail driving head will be drawn from its normal elevated position, as shown in Fig. 2, to its lowermost nail driving position with the nail chucks and nail driving rods in nailing relation upon the box parts and then will be again elevated to its uppermost or normal position.

The nail driving shaft 25 is arranged to be power driven through a suitable source of power, illustrated as a motor 31, mounted in any suitable manner upon the bed plate 1, though I prefer that the motor 31 be mounted upon a suitable motor base 32 which may be formed as a horizontally projecting bracket mounted upon the upper end of the supporting bearing member 19. The connection between the bearing member 19 and the bracket 32 may be adjusted so as to permit the vertical adjustment of the motor relative to the bed plate 1 of the machine for the purpose of adjusting or tightening a sprocket chain 33 through which power from the motor is applied to the live member 34 of a friction clutch, which member is preferably rotatable about a shaft 35 journaled in the end frame 2 and the bearing member 19. The driven member 36 of the clutch is keyed to the shaft 35 so that when the clutch members are engaged, as by means of a suitable clutch-operating yoke 37, actuated by a nail driving pedal 38, power is directly transmitted from the motor 31 to the shaft 35. The shaft 35 extends through the side frame 2 and terminates in a pinion 39 which is meshed with the large gear 28 on the shaft 25 so that whenever the nail pedal 38 is actuated the shaft 25 will be rotated to operate the nail driving mechanism.

Figure 2:
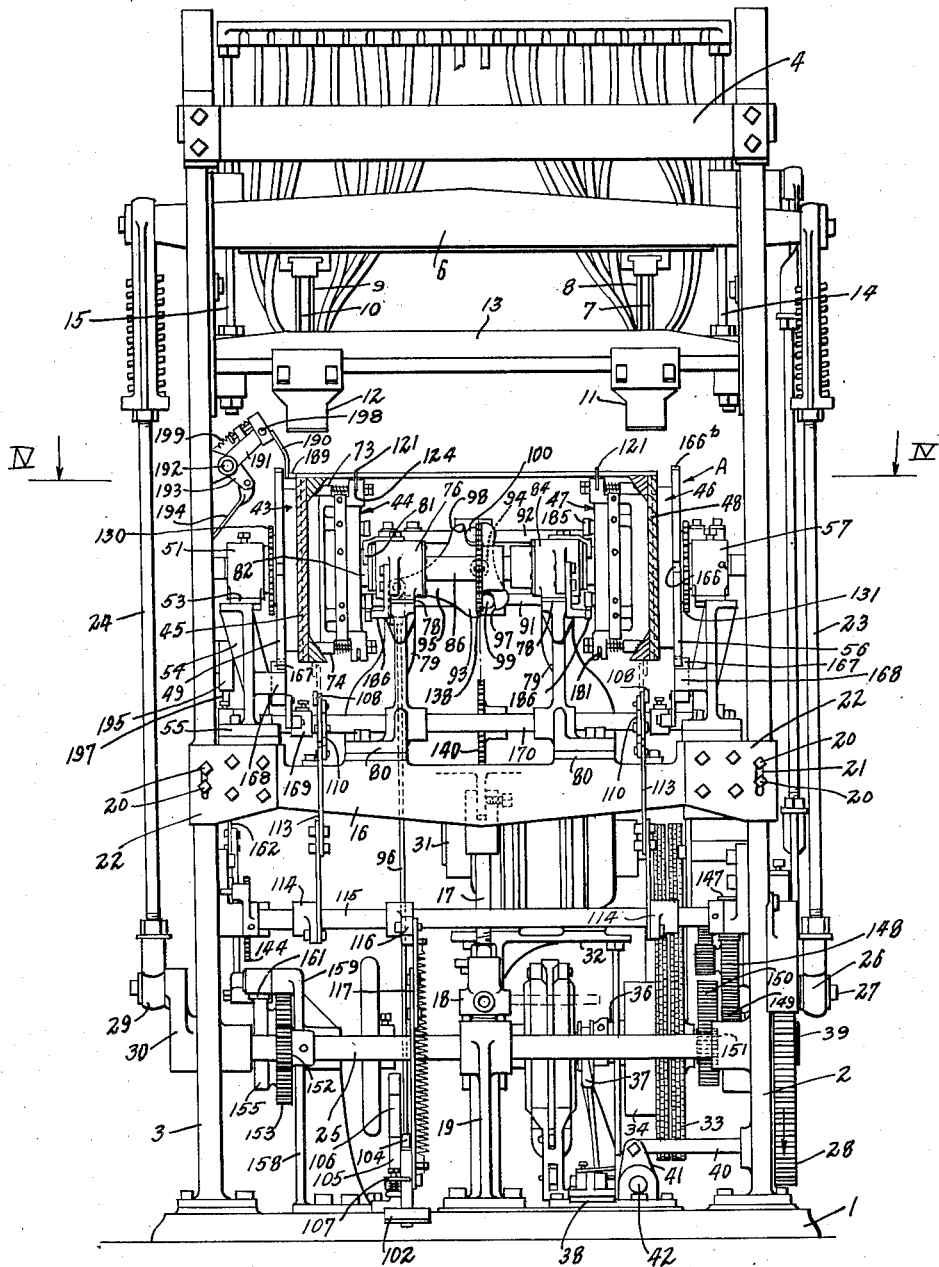
Fig. 2 is a front elevational view of a machine constructed in accordance with my invention.

I prefer that the nail driving mechanism should operate through only a single cycle of its operations upon each actuation of the clutch, namely from the upper position as shown in Fig. 2 to the nail driving position and back to the upper position, and to accomplish this result I provide a suitable cam surface (not shown) upon the inner side of the gear 28 to engage the end of a rod or bar 40 which is in turn connected through a crank 41 to the same shaft 42 which is operated by the pedal 38 to actuate the clutch. Thus upon the completion of one rotation of the gear 28 the cam upon the gear will press the rod 40 to the left to move the clutch yoke 37 back to the position shown in Fig. 2, disconnecting the clutch.

In order to properly support the box parts while they are being secured together, or nailed together in the machine, I prefer to provide a box-supporting form A mounted upon and supported by the nailing table 16, which form is adapted to engage and hold the end sections or shooks of the box while the sides and bottom are placed thereon and nailed in place. For this purpose I have illustrated the form A as comprising four units, namely an outer end unit 43 at the left-hand side of the machine, an inner form unit 44 cooperating with the unit 43 to hold between them the left-hand end shook 45.

At the opposite end of the machine is an outer form 46 which cooperates with an inner end form 47 to hold between them the right-hand end shook 48. The units 43 and 44 are arranged to move toward and away from each other, as are the units 46 and 47, so that when the units 43 and 44 are separated from each other they provide ample space permitting the insertion of the prepared box end 45, but when the units 43 and 44 are moved toward each other they securely hold the box end between them to provide adequate support during the operations of nailing the side boards or slats upon the end shook 45.

The form A comprising the assembled units 43, 44, 46 and 47 is arranged to be supported upon the nailing table 16, as by mounting suitable bearing members upon the nailing table to engage each of the units individually.

Figure 4:
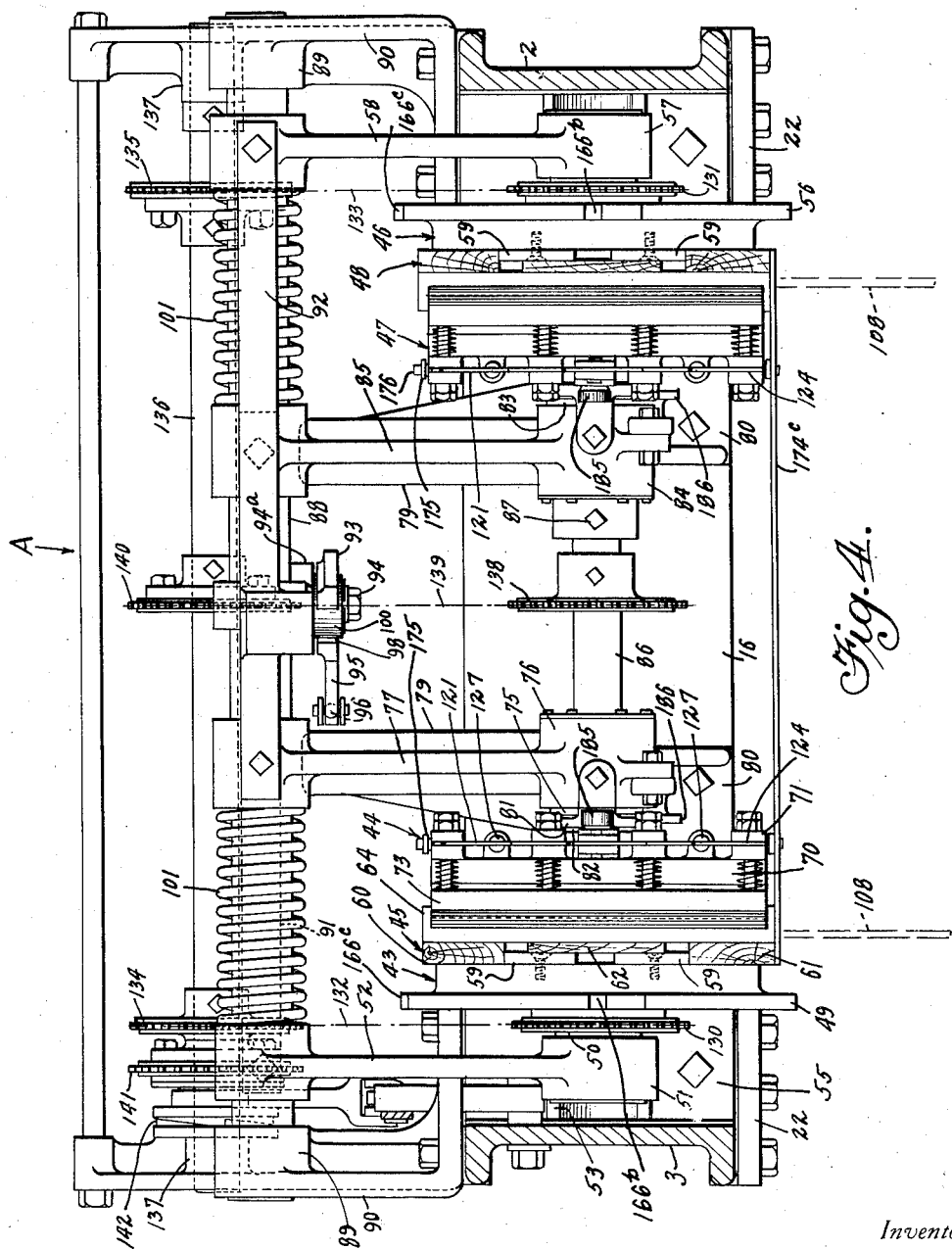
Fig. 4 is a horizontal sectional plan view, taken along line IV—IV of Fig. 2.
Figure 5:
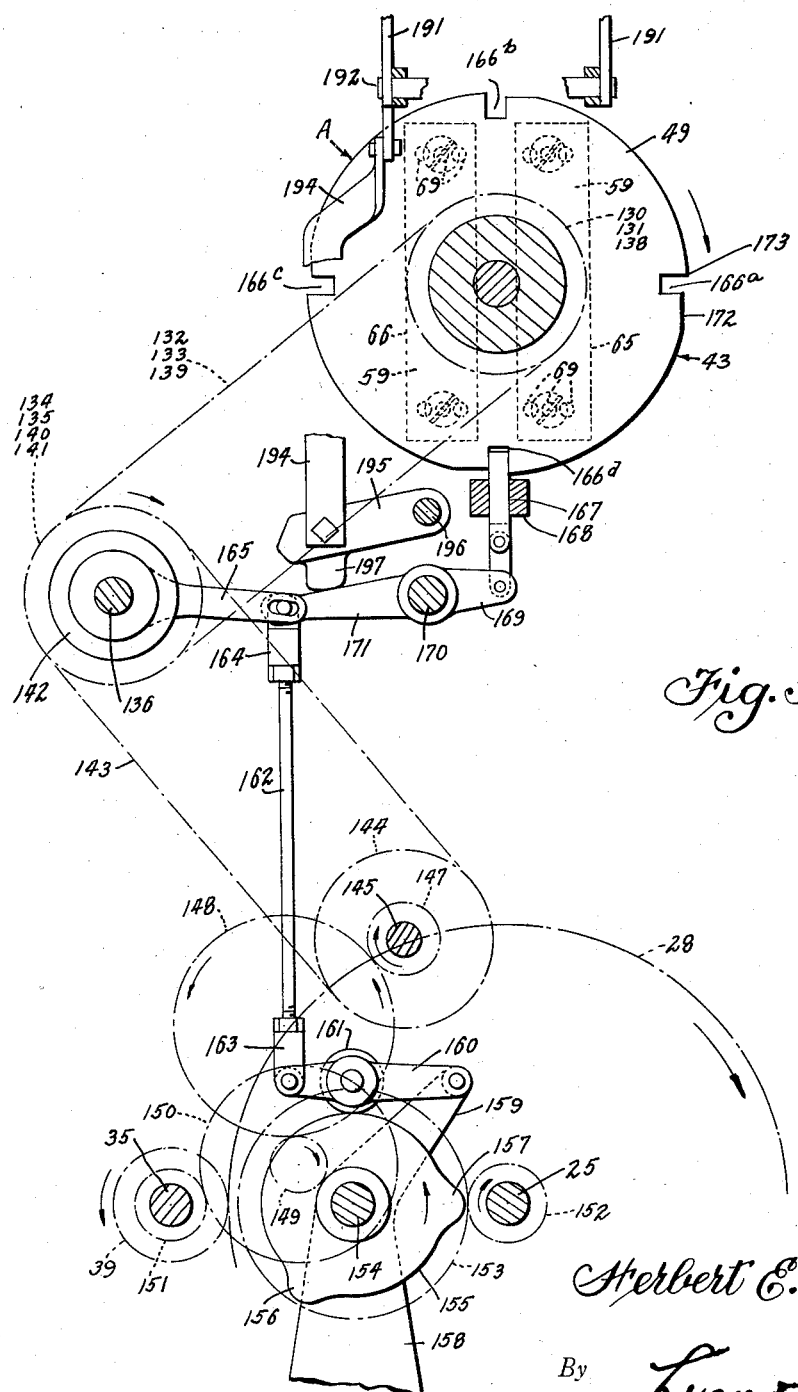
Fig. 5 is a detail diagrammatic view illustrating the indexing and locking device employed with my machine.

By referring particularly to Figs. 2, 4 and 5 it will be observed that the end unit 43 comprises a relatively large plate 49 either formed integrally with or attached to a hub 50 which projects axially from the plate to be rotatably mounted in the outer end 51 of a clamping arm 52. The end 51 of the clamping arm 52 has its lower face provided with a machined surface 53 which slidably engages a corresponding surface upon the upper end of an upright bracket 54 mounted directly upon the nailing table 16, as is indicated at 55.

Thus while the end unit is supported rotatably in the clamping arm 52 the entire assembly of clamping arm and unit is slidable laterally with respect to the machine to provide for the necessary motion for permitting the opening up of the units 43 and 44 and the clamping of these units when moved toward each other.

The end unit 46 is similarly constructed with an indexing plate 56 having a hub thereon which is rotatably mounted in the end 57 of a second clamping arm 58.

Both of the end units 43 and 46 are provided upon their inner faces with a pair of metal strips 59 which in either of the normal rest positions of the form, as will be hereinafter described, extend vertically relative to the machine. These strips 59 are preferably formed of material of such thickness that they may enter between the end rails 60 and 61 (see Fig. 1) of the end assembly employed for the end of the box or crate. These strips 59 act as shoulders or anvils upon which the rails 60 or 61 rest during the nailing of the bottom slats and resist the strain of the nail driving so as not to break the crate end assembly.

By referring particularly to Fig. 1, it will be observed that the end shook of a crate type of box is preferably formed of three lengths of material 60, 61 and 62, the outer ones 61 and 62 of which are called the rails, while the center one 62 is called a panel and is usually of lesser thickness than the rails. All of the members 60, 61 and 62 are secured at their upper ends to a post 63 which in the form of box illustrated herein is triangular in cross section and similarly the lower ends of all of the members 60, 61 and 62 are secured together to a second post 64. Thus the strips 59 on the unit 43 are spaced relative to each other so that their outer edges 65 and 66 will engage the inner edges 67 and 68 of the rails 60 and 61 when the end member is in place in the machine.

By referring particularly to Fig. 5 it will be observed that the strips 59 are preferably adjustable upon the plate 49 as by providing a plurality of holes 69 through which bolts may be passed to secure the strips to the plate 49 and thus accommodate the same end units 43 and 46 to different widths of boxes or crates.

The inner units 44 and 47 of the form A are preferably constructed of relatively thick plates 70 having radially extending flanges 71 and 72 formed upon opposite side edges thereof to constitute mounting means for a pair of clamping shoes 73 and 74, respectively. These clamping shoes are arranged to engage the end shook or assembly below the triangular cross pieces or posts 63 and 64 to firmly support the underneath sides of these posts when nails are to be driven into them as the slats or side boards are secured to the box.

In the form of the device illustrated herein, which is particularly adapted for making boxes employing triangular posts 63 and 64, the outer surfaces of the shoes 73 and 74 are preferably serrated to insure a better frictional grip upon the angular surface of the posts 63 and 64.

In view of the fact that the thickness of the posts 63 and 64 may vary, as may also the thickness of the rails 60 and 61, I prefer to mount the shoe 73 yieldingly upon the plates 70 so that when the units 43 and 44 are in clamping relation the shoes 73 and 74 will yield to prevent undue pressure being exerted upon the end form and to insure that the plane in which the rails 60 and 61 will lie will always be at the same position or same plane relative to the machine. Thus the rails 60 are always accurately aligned with the nail chucks 12 and the nail driving heads 10 employed for driving nails into these rails, as well as insuring that the extreme outer surfaces of the rails 60 will always lie at the same points in alignment with the extreme ends of the side boards or slats of which the box is constructed.

The plates 70 are preferably formed with suitable hubs 75 extending axially therefrom rotatably supported in a bearing end 76 upon a third clamping arm 77 which like the clamping arms 51 and 57 are provided with machined surfaces upon the lower sides thereof to engage and slide upon similar surfaces 78 upon a supporting bracket 79 which is in turn secured to the nailing table 16, as indicated at 80.

Figure 3:
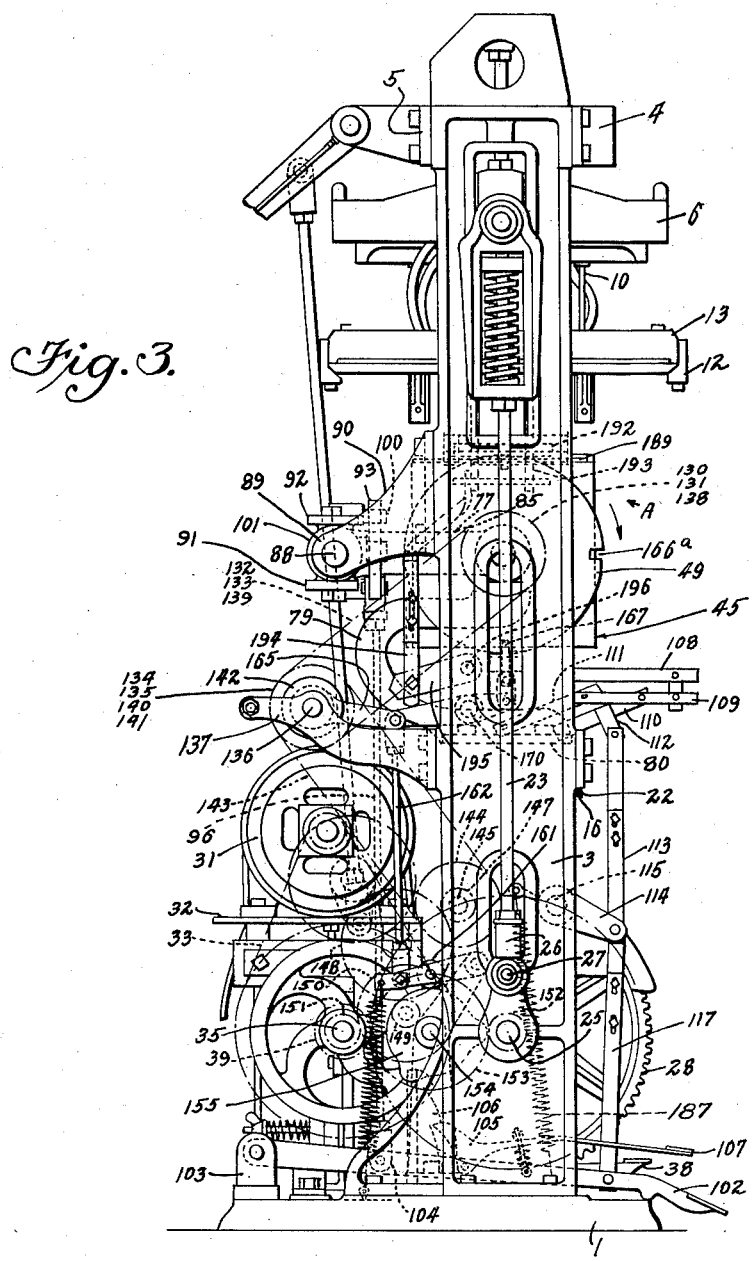
Fig. 3 is a side elevational view of the machine shown in Fig. 2.

By referring particularly to Fig. 3, it will be observed that the bracket 79 is shaped in the form of a letter C, the interior cavity of which extends considerably rearwardly of the machine so as to provide a sufficient space to accommodate the side boards upon one side of the box, while the opposite side edges of the end members are presented uppermost for the securing of the second side to the box. The upper end 76 of the clamping arm 77 is provided with a projecting finger 81 (Fig. 2) which engages a suitable groove 82 in the hub 75 to insure that lateral movement of the clamping arm 77 will laterally move the plate 70 either toward the unit 43 or away therefrom. Similarly the unit 47 is provided with a hub 83 which is mounted in a bearing end 84 of a fourth clamping arm 85.

The two hubs 75 and 83 are keyed to a common shaft 86, one of the hubs being rigidly secured to the shaft as by means of a set screw 87, while the other of the hubs is slidable axially upon the shaft.

Thus by moving the clamping arms 52 and 77 relative to each other the units 43 and 44 may be clamped together and separated, while similarly the clamping arms 58 and 85, when moved toward and away from each other, will clamp or release the units 46 and 47.

By referring particularly to Fig. 4, it will be observed that the outer ends of the clamping arms 52, 77, 85 and 58 are slidably mounted upon a shaft 88 journaled in suitable bearings 89 formed in brackets 90 secured to the rear surfaces of the side frames 2 and 3 of the machine. The clamping arms 52 and 85 are connected rigidly with respect to each other by means of a strap 91 bolted directly to the two clamping arms, while similarly the clamping arms 77 and 58 are rigidly secured together by means of a strap 92. The clamping arms are moved relative to each other by means of a double bellcrank 93 pivotally secured as at 94 upon a collar 94ᵃ which is in turn rigidly secured to the shaft 88. The double bellcrank 93 is provided with an operating arm 95 to which may be connected an operating rod 96, while the outer arms of the bellcrank extend in opposite directions at right angles to the operating arm 95 and are provided at their ends with bifurcations 97 and 98 to receive and engage, respectively, a pair of pins 99 and 100. The pin 99 is secured to and extends horizontally from the strap 91 while the pin 100 similarly extends from the strap 92 so that vertical movement of the operating arm 95 of the double bellcrank 93 will cause the straps 91 and 92 to be extended relative to each other or contracted, thus simultaneously moving the units 43 and 47 in one direction and units 46 and 44 in the opposite direction. This operation is employed for securing and releasing the end members of the box from the form A, as by providing a pair of springs 101 between the clamping arms 52 and 77 and the clamping arms 85 and 58, respectively, so that normally each of these pairs of arms is urged away from each other to separate the units 43 and 44 and the units 47 and 46. However, when the box end members are put in place, downward movement of the operating rod 96 will cause the units to move toward each other and securely clamp the end members in place. For this purpose I provide a foot lever 102 pivotally secured in an upstanding bearing 103 mounted upon the bed plate 1 of the machine to connect with the lower end 104 of the operating rod 96 so that each time the foot lever 102 is depressed the units comprising the form will be clamped together once the ends are clamped in place and they should remain clamped while both of the sides and the bottom of the box are secured in place.

For this purpose I provide a latch pawl 105 upon the lever 102 to engage a notched latch 106 rigidly secured to the base of the machine so that when the lever 102 is depressed the pawl 105 will engage the latch and hold the same depressed until a release pedal 107, formed upon the pawl 105, is operated to release the pawl from the latch.

The apparatus thus far described will be best understood with reference to an assumed cycle of operations necessary to construct a box: At the start of the operation of the machine, the operator will select two previously manufactured end members for the boxes or crates to be made in the machine, and it is assumed at this time that the pedal 102 is in its uppermost position and the units 43, 44, 46 and 47 are expanded or open. The operator may place the end members between the respective units with the posts 63 and 64 lying in a horizontal direction. To assist in the proper placing and centering of these forms, I prefer to provide a guide 108 immediately below the space between the units 43 and 44 and the units 46 and 47, respectively. These guides 108 are particularly illustrated in Fig. 3 as comprising a top rail or plate having a length slightly in excess of the width of the pre-formed box ends. The guide plates 108 are preferably mounted upon a bar 109 which is in turn supported upon a pair of links 110 and 111 pivoted upon the nailing table 16. A forwardly projecting arm 112, secured to the link 110, may be secured to a bar 113, the opposite end of which is connected through a crankarm 114 to a shaft 115 which extends entirely across the machine.

The shaft 115 is illustrated as being provided with a crankarm 116 which projects forwardly of the machine to be connected by means of a link 117 to the foot lever 102 so that when the lever 102 is in its uppermost or released position the guide plates 108 will be elevated into positions immediately below the form A and thus guide the end members of the box into place within the form, but as soon as the foot lever 102 is operated to move the units 43 and 47 toward the units 46 and 44, respectively, into clamping relation the guide plates 108 will be swung forwardly and downwardly relative to the form to thus remove them from possible interference with the form units as they are subsequently rotated.

The end members of the box now being in place and the operator having depressed the pedal 102 to move the units of the form into clamping relation therewith, the machine is now ready for the application of the slats or shooks which are to form one side of the box.

By referring particularly to Fig. 1, it will be observed that the first side of the box is constructed of a plurality of slats, there being three of such slats illustrated therein, numbered 118, 119 and 120, respectively.

The slats are usually supplied to the operator of the machine cut into lengths equal to the desired length of the finished box so that by selecting three of such slats the operator may place them upon the uppermost edges of the box ends and then nail them in place. However, to assist the operator of the machine in properly spacing the slats 118, 119 and 120 across the upper edge of the end member of the box, I provide a slat-stop or spacer guide 121 upon each of the units 44 and 47.

Figure 6:
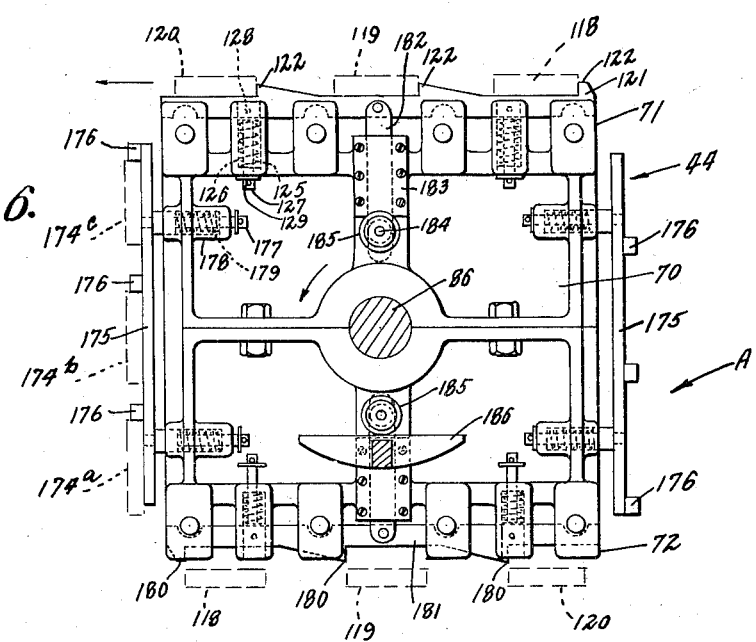
Fig. 6 is a detail view of one of the end forms or shook supports.

By referring particularly to Fig. 6, it will be observed that the slat stops 121 are constructed in the form of an elongated plate, the upper edge of which is provided with three projecting fingers 122 properly spaced so that the slats when placed in abutting relation therewith will be properly spaced across the entire width of the box end member. The slat-stop 121 is slidably received in a slot 124 formed in the flanges of the plate 70 and is normally urged outwardly with respect to the plate 70 by means of two springs 125 seated within sockets 126 formed in or as a part of the flange 71 and surrounding pins 127, one end of which is riveted as at 128 to the slat-stop 121, while the other end of the slat slides freely through an opening in the socket 126 but is limited in its outward movement theretrom by means of a suitable pin 129. Thus while the slat-stop 121 is normally projected by its springs to a position to engage the slats as they are placed in the machine, the stop 121 may be readily depressed by any dragging movement of the slats to the left, as viewed in Fig. 6. Thus the slats may be readily placed in the desired position and the operator may then actuate the nailing pedal 38 to cause the nail driving head to descend and drive the heads into and through the slats to secure them to the end members of the box.

Upon the completion of the nailing operation of the first side of the box, the form should be rotated through 90° to present the next adjacent edges of the box and the members uppermost to receive the bottom boards for the box. This rotary operation is accomplished by connecting the driving gearing to the form units and arranging to supply rotative power thereto upon the completion of the nailing operation.

It will be observed that the outer form units 43 and 46 are each provided with a sprocket rigidly attached thereto, that associated with the form unit 43 being designated by the reference character 130, while the sprocket associated with the outer form 46 is designated by the reference character 131. These sprockets are each connected by suitable chains 132 and 133 to corresponding sprocket wheels 134 and 135 rigidly secured to a shaft 136 which extends across the rear of the machine and is journaled in suitable bearing brackets 137 secured to the side frames 2 and 3.

Thus upon the movement of the shaft 136 the outer form units 43 and 46 will be simultaneously rotated and will maintain their positions relative to each other during all rotary movement of the form units.

It will also be observed that a sprocket 138 is provided upon the shaft 86 which engages both of the inner form units 44 and 47, and this sprocket is in turn connected through a suitable chain 139 to a sprocket 140 also rigidly connected to the shaft 136. Thus upon rotation of the shaft 136 the inner form units will be rotated in unison with the outer form units. The shaft 136 is arranged to be driven in proper timed relation to the operations of the machine through a drive mechanism which includes a sprocket 141 rotatable upon the shaft 136 and connectible therewith through the medium of a clutch 142, the sprocket 141 being connected through a suitable chain drive 143 to a drive sprocket 144 secured upon an axial shaft 145 and arranged to be continuously driven by the motor 31 through gearing which includes a pinion 147 secured to the shaft 145, meshing with a gear 148, which in turn engages a pinion 149 associated with a gear 150 which in turn engages a pinion 151 on the live clutch member 34. Thus during the entire operation of the motor 31 of the machine the sprocket 141 will be continuously rotated but the shaft 136 will only be rotated when the clutch 142 is engaged.

Since it is desirable to cause rotation of the forms only between successive operations of the nailing apparatus, I provide a clutch operating mechanism for the clutch 142 which consists of a pinion 152 (Fig. 5) rigidly secured to the nail driving operating shaft 25 which in turn meshes with a gear 153 mounted upon a suitable stub shaft 154 and has a cam 155 rigidly associated therewith so that by properly selecting the ratio of gearing between the pinion 152 and the gear 153 the cam 155 is rotated once through a complete revolution as a result of three complete rotations of the nail driving shaft 25. The cam 155 is illustrated as having a pair of high points 156 and 157 thereon which are spaced from each other by approximately 120° while the remainder of the surface of the cam 155 is concentric with the shaft 154.

The stub shaft 154 which carries the cam 155 has one of its ends journaled in an upstanding support or bracket 158 mounted upon the bed plate 1 of the machine, which bracket has an extending arm 159 at the outer end of which is pivoted a lever 160. The lever 160 is illustrated as extending rearwardly of the machine and has a roller 161 thereon engaging the surface of the cam 155, while a rod 162 is connected at one of its ends 163 with the lever 160, the outer end 164 of the rod being connected to a crank arm 165 extending from the clutch 142.

Thus each time the cam 155 is rotated to bring one of its high points 156 or 157 into engagement with the roller 161 and the rod 162 will be lifted and move the clutch-operating crank-arm 165 so as to engage the clutch 142 and cause the shaft 136 to be driven.

As will be understood by those skilled in the art, the operation of the nail driving pedal to rotate the nail driving shaft causes this shaft to operate through one complete revolution and then stop, due to the interconnection of the gear 28 and the clutch operating yoke through the medium of the rod 40. Thus the cam 155 should be so positioned upon its shaft 154 that immediately prior to the time the shaft 25 comes to rest at the end of a nailing operation the cam 155 should elevate the lever 160 to start the rotation of the form units and by properly selecting the ratio of gearing between the motor and the shaft 136 it will be apparent that upon each operation of the clutch the form units will be rotated rapidly.

However it is desired that when one of the sides has been placed upon the box ends and nailed thereto that the form should be rotated only through 90° to present the next edge of the end members of the box uppermost to receive the bottom boards for the box or crate, and means must be provided for accurately stopping the form units when they have rotated through this angle. This may be readily accomplished by employing the plate 49 upon the outer form unit 43 as an indexing plate as by providing a plurality of notches 166a, 166b, 166c, and 166d spaced at 90° angles therearound. The notches 166a are engaged by a pin or bar 167 mounted upon a suitable guide 168 which may be formed as an integral part of the bracket 54. The bar 167 is illustrated particularly in Fig. 5 as having its lower end connected to one end of a lever 169 rigidly secured to a shaft 170, the opposite end 171 of the lever being connected to the upper end 164 of the rod 162 so that upon each elevation of the rod 162 to engage the clutch 142 the bar 167 will be withdrawn from the notch 166a, and notches 166b, 166c and 166d with which it has previously been engaged so as to release the form unit and permit the same to be rotated by the driving connections 134, 132, etc.

It will, however, be observed that the high points 156 and 157 of the cam 155 are relatively narrow and would cause only a momentary elevation of the rod 162, but as soon as the bar 167 has been withdrawn from the notch 166d and the form has started its movement, the end of the bar 167 will ride upon the periphery of the plate 49 and will hold the lever 169 depressed at its right-hand end, as viewed in Fig. 5, and thus will hold the clutch 142 in engagement until the next notch 166a is presented to the bar 166. The shaft 170 extends across the machine and to its right-hand end is secured another lever and bar similar to 169 and 167 which simultaneously engages notches in the plate 56 on the right-hand form section.

It will be observed that immediately in advance of the notches 166a, 166b, 166c and 166d the periphery of the plate 49 is cut away, as indicated at 172, so that at this time, and only at this time, will the clutch 142 start to disengage and thus when the corner 173 of the notch 166a strikes the bar 167 it will abruptly stop the form in the new position and will allow the bar 167 to be elevated, thus disengaging the clutch 142.

With the form in the new position, the operator may place the slats 174a, 174b and 174c, comprising the bottom boards of the box, and then he may operate the nail driving pedal 38 to cause the nail driving apparatus to go through its cycle of operations to secure the bottom boards to the end members.

In order to assist the operator in properly placing the slats 174a, 174b and 174c upon the end members, I prefer to provide a guide 175 (Fig. 6) upon the inner forms 44 and 47. The guides 175 are preferably formed as a strap or bar of suitable material from which may project a plurality of pins 176 properly spaced along the strap so that the operator may place the boards from the front of the machine into abutting relation with the pins, which positions will correspond to the desired positions of the slats upon the box ends. The guides 175 are preferably yieldingly mounted upon the plates 70 as by securing the guides to a pair of rods 177 extending through suitable sockets 178 formed upon the plate 70, which sockets may also contain springs 179 tending to spread the guides outwardly, but permitting the guides to yield under the nailing pressure as may be necessary to accommodate different thicknesses of slats which may be used.

It will also be observed that when the forms have been rotated to the new position, as hereinbefore described, the shoes 73 and 74 will now be disposed in vertical positions and will not appreciably support the box end members 45, but when the form has been rotated to the new position the plates 59 upon the outer form unit 43 will now be disposed horizontally, and the uppermost one of these plates will engage below the uppermost rail 61 of the box end member and provide the necessary resistance to the nailing pressure. Upon the completion of the nailing of the bottom slats upon the box end members, the form units should again be rotated to 90° to present the next adjacent edge of the end members uppermost ready to receive the second side of the box. This result is accomplished by the fact that upon the second operation of the nailing apparatus the nail driving shaft 25 will have again been rotated through one complete revolution, thus driving the cam 155 to the position at which the high point 156 thereof will engage and lift the lever 160 to again operate the clutch 142 and to withdraw the bar 167 from the notch 166a of the indexing plate 49. Thus the form units will be rotated to another 90° angle as hereinbefore described, until the notch 166 is engaged by the bar 167. The operator may then place the remaining slats, forming the second side of the box, and nail them in place by operation of the nailing mechanism.

Again the operator may align the slats forming the second side of the box by placing them into abutting relation with notches or guide projections 180 extending from a slat-stop or spacer guide 181 which corresponds in all particulars with the guide 121 upon the opposite side of the inner forms 44 and 47.

Upon the completion of this third nailing operation the box is complete, ready to be removed from the machine, and it will be noted that in accordance with the foregoing description of the operation of the machine the form units have been rotated to a position 180° from the original position so that the side of the box which was attached to the end members is now upon the lowermost side of the form, the bottom of the box being now upon the front side of the form, while the second side, which has just been placed upon the box, is in the uppermost position. Hence all that is necessary is for the operator to grasp the box and draw it forwardly with respect to the machine in order to remove the finished box therefrom.

However, by referring to Fig. 6, it will be observed that with the forms in this position the slat guide 181 has its guide projections 180 directed toward the rear of the box and would prevent the removal of the box from the form unless this guide is in some manner withdrawn or removed through engagement with the slats forming that side of the box which is lowermost in the machine.

By referring particularly to Figs. 2 and 6, it will be observed that each of the slat guides 121 and 181 are provided with a link 182 which extends through a suitable guide bearing 183 formed upon the plate 70. On the outer end of each of the links 182 is provided a pin 184 upon which is mounted a roller 185 which projects inwardly toward the center of the machine to such position that it may engage cams 186 rigidly secured to the bearing ends 84 and 87 of a clamping arm 85, and 77, respectively. Thus whichever one of the slat guides is in the lowermost position will be engaged by the cam 186 to elevate the same or to retract the same to a position at which it will disengage the slats on the lowermost side of the box. Thus the box may be readily withdrawn from the forms.

It will be observed, however, that up to this time the form units have been maintained in clamping relation relative to each other to hold the end members of the box and it is, therefore, essential that at this point of the operation of the machine that the operator should release the form members, which he may do by depressing the release pedal 107, disengaging the pawl 105 from the notched latch 106 and permitting the form clamping pedal 102 to again be elevated.

It will be observed that the compression springs 101 will normally urge the form units apart and while this pressure may be sufficient to elevate the lever 102 I prefer to provide an additional spring 187 engaging the pedal lever 102 to assist in elevating this lever. At this point in the operation of the machine, the box having been removed, the machine is now ready for the construction of a new box which may be accomplished by merely inserting a new set of box end members between the form units and again clamping these form units together by operation of the clamping pedal 102.

It will be noted that it is unnecessary to return the form members to their original positions since the point at which the form members come to rest at the finish of one box presents the form members ready to immediately receive the side boards forming the first side of a new box. Thus considerable time is saved by not requiring that the form be rotated upon the completion of one box. It will also be observed that the cam 155, having no high point during a distance of travel thereof of 240° permits the two successive operations of the nailing apparatus to nail the last side to one box and the first side to the next box without operating the clutch 142 to move the form.

It may be desirable in some instances to provide a guide for the ends of the slats forming the sides and bottom of the box or crate which is to be manufactured in my machine, and for this purpose I have illustrated a guide bar 189 arranged to extend longitudinally of my machine to be positioned in exact alignment with the outer surface of the end members of the box when the end members are in clamped relation in the form. This guide bar 189 may be suitably supported upon a pair of fingers 190 which extend from a bellcrank 191 pivoted upon the side frame 3, as indicated at 192. One arm 193 of the bellcrank, extends downwardly to be engaged by a link 194 which is in turn pivotally connected to a short lever 195 pivoted at 196 in the side frame 3, the lever 195 having a projecting finger 197 thereon which rests upon and rides upon the arm 171 of the lever 169 which operates the locking bar 167. Thus whenever the locking bar 167 is operated to release the indexing plate 49 the bellcrank 191 will be elevated to move the guide 189 out of alignment with the box end members and to a position in which it will not interfere with the rotation of the box form. I prefer to mount the fingers 190 upon the bellcrank 191 as by pivoting them to the bellcrank 191, as indicated at 198 and provide a spring 199 which will yieldingly hold the guide in proper relation with the box end members, but will permit yielding of the guide bar as it is moved upwardly to a position out of the way of the box form members.

It will be observed that I have provided a box manufacturing machine in which the form units are readily adapted to separate sufficiently to permit the ready insertion of the box end members and yet may be clamped into tight relation with the box end members and maintained in this relation during the entire nailing operations, which are to be performed upon the box. It will also be observed that I have provided box form units which are not only adapted to receive and operate upon box end members which are formed of single boards or units in which all of the members lie in the same plane, but I have provided box form members which will receive and adequately support box end members which are formed with portions of the same lying in different planes.

It will be further observed that I have provided means for accurately rotating the form members, and for stopping them in the desired positions, which will permit the form members to be continuously rotated in the same direction throughout the manufacture of a plurality of successive boxes.

By referring particularly to Fig. 1, it will be observed that the arrangement of the nails which are driven into the various slats forming the box may be varied with the different sides or bottom of the box, such selection of the nails or nailing positions being readily made through the employment of nail-selecting and feeding mechanism, such as is shown and described in the Herbert E. Twomley application Serial No. 533,655. The outside row of nail punches 7 and 10 drive the nails for the bottom at which time the inside row of nail punches 8 and 9 are cancelled automatically. Also when nailing the first and second side a part of the outside row are cancelled, as shown in Fig. 1.

While I have shown and described the preferred embodiment of my invention, it is to be understood that I do not wish to be limited to any of the details of construction shown herein, except as defined in the appended claims.

I claim:

1. In a machine for making boxes, a form for holding prepared box ends in nailing position to receive side boards and bottom boards, said form comprising a set of form sections for each of said box ends, and means mounting both the form sections of each set for movement toward and away from each other to separate said sections for the passage of box ends therebetween and for clamping said box ends therebetween, each set of form sections having means thereon for positively centering the box-end clamped therebetween in a predetermined position radially and circumferentially with respect to the axis of rotation of said form.

2. In a machine for making boxes, a nailing table, a plurality of stationary supports secured to said nailing table and extending above the same, a form for holding prepared box ends in nailing position, said form comprising four sections, means slidably mounting each of said form sections individually upon a separate one of said stationary supports for movement laterally of said machine, whereby two of said form sections may be moved toward and away from each other to clamp a box end therebetween, and the remaining two of said sections may be moved toward and away from each other to clamp a second box end therebetween, said form sections having means thereon for positively centering box-ends clamped therebetween in a predetermined position with respect to the axis of rotation of said form, whereby nailing forces on said box-ends are applied directly to said form sections, which in turn are positively supported upon said stationary supports to resist movement in response to said nailing forces.

3. In a box making machine, a form for supporting box ends, said form comprising a pair of outer form sections for engaging the outer surfaces of said box ends, a pair of inner sections for engaging the inner surfaces of said box ends, means individually supporting each of said form sections for sliding movement laterally of said machine, means for simultaneously moving said inner form sections toward said outer form sections and for simultaneously moving said outer form sections toward said inner form sections to clamp said box ends therebetween, a shaft extending laterally of said machine, driving means on said shaft individually coupled to each of said outer form sections and to said inner form sections to rotate all of said form sections synchronously.

4. In a box making machine a rotatable form for supporting box ends in nailing position, said form comprising a pair of form sections for each of said box ends, means mounting said form sections for lateral movement toward and away from each other to clamp said box ends therebetween, means for moving said form sections toward and away from each other, and means operably responsive to movement of said form moving means to separate said form sections for guiding box ends between said separated form sections.

5. In a box making machine, a rotatable form for supporting box ends in nailing position, said form comprising a pair of form sections for each of said box ends, means mounting said form sections for lateral movement toward and away from each other to clamp said box ends therebetween, means for moving said form sections toward and away from each other, guiding means for guiding said box ends into position between said form sections, and means operably responsive to movement of said form moving means to clamping position for retracting said guiding means out of the path of rotation of said form.

6. In a box making machine, a rotatable form for supporting box ends in nailing position, said form comprising a pair of inner form sections for engaging the inner surface of said box ends and a pair of outer form sections for engaging the outer surfaces of said box ends, means individually mounting said form sections for rotary movement, a shaft extending laterally of said machine, means individually coupling said shaft to each of said outer form sections and to said inner form sections for synchronously rotating all of said form sections upon rotation of said shaft, nailing means on said machine for driving nails into said box ends, power means for driving said nailing means, clutch means connecting said power means to said shaft to rotate said shaft, and means operably responsive to movement of said nailing means to predetermined positions for engaging said clutch to rotate said form sections in timed relation to the operation of said nailing means.

7. In a box making machine, a rotatable form for supporting box ends in nailing position, said form comprising a pair of inner form sections for engaging the inner surface of said box ends and a pair of outer form sections for engaging the outer surfaces of said box ends, means individually mounting said form sections for rotary movement, a shaft extending laterally of said machine, means individually coupling said shaft to each of said outer form sections and to said inner form sections for synchronously rotating all of said form sections upon rotation of said shaft, nailing means on said machine for driving nails into said box ends, power means for driving said nailing means, clutch means connecting said power means to said shaft to rotate said shaft, timing means actuated by said nailing means for actuating said clutch to rotate said form in timed relation with the operations of said nailing means.

8. In a box making machine, a rotatable form for supporting box ends in nailing position, said form comprising a pair of inner form sections for engaging the inner surface of said box ends and a pair of outer form sections for engaging the outer surfaces of said box ends, means individually mounting said form sections for rotary movement, a shaft extending laterally of said machine, means individually coupling said shaft to each of said outer form sections and to said inner form sections for synchronously rotating all of said form sections upon rotation of said shaft, nailing means on said machine for driving nails into said box ends, power means for driving said nailing means, clutch means connecting said power means to said shaft to rotate said shaft, and timing means operated by movement of said nailing means for engaging said clutch to rotate said form through an angle of 90° upon each of two successive operations of said nailing means and for holding said clutch disengaged during the next two successive operations of said nailing means.

9. In a box making machine, a rotatable form for supporting box ends in nailing position, said form comprising a pair of inner form sections for engaging the inner surface of said box ends and a pair of outer form sections for engaging the outer surfaces of said box ends, means individually mounting said form sections for rotary movement, a shaft extending laterally of said machine, means individually coupling said shaft to each of said outer form sections and to said inner form sections for synchronously rotating all of said form sections upon rotation of said shaft, nailing means on said machine for driving nails into said box ends, power means for driving said nailing means, clutch means connecting said power means to said shaft to rotate said shaft, timing means actuated by said nailing means for actuating said clutch to rotate said form in timed relation with the operations of said nailing means, locking means for holding said form against rotation in any one of a plurality of positions, and means operably responsive to the actuation of said clutch for releasing said locking means.

10. In a box making machine, a form for supporting the box ends in nailing position in said machine, comprising a plurality of form sections for clamping said box ends therebetween, means on diametrically opposite edges of said form sections for guiding and positioning side boards and end boards into nailing position on said box ends, and means mounting said guiding means for retraction to positions out of engagement with said slats when said box ends are removed from said machine.

HERBERT E. TWOMLEY.